(12) United States Patent
Kubota et al.

(10) Patent No.: US 11,301,806 B2
(45) Date of Patent: Apr. 12, 2022

(54) RECOMMENDED ORDER QUANTITY DETERMINING DEVICE, RECOMMENDED ORDER QUANTITY DETERMINATION METHOD, AND RECOMMENDED ORDER QUANTITY DETERMINATION PROGRAM

(71) Applicant: NEC CORPORATION, Tokyo (JP)

(72) Inventors: Yuuki Kubota, Tokyo (JP); Takayuki Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 16/650,904

(22) PCT Filed: Jul. 3, 2018

(86) PCT No.: PCT/JP2018/025245
§ 371 (c)(1),
(2) Date: Mar. 26, 2020

(87) PCT Pub. No.: WO2019/064790
PCT Pub. Date: Apr. 4, 2019

(65) Prior Publication Data
US 2020/0279212 A1    Sep. 3, 2020

(30) Foreign Application Priority Data
Sep. 26, 2017    (JP) .............................. JP2017-184976

(51) Int. Cl.
*G06Q 10/08*    (2012.01)
*G06Q 30/02*    (2012.01)
*G06Q 40/06*    (2012.01)

(52) U.S. Cl.
CPC ......... *G06Q 10/087* (2013.01); *G06Q 10/083* (2013.01); *G06Q 30/0202* (2013.01)

(58) Field of Classification Search
CPC .... G06Q 10/087; G06Q 10/083; G06Q 10/08; G06F 7/49963
(Continued)

(56) References Cited

U.S. PATENT DOCUMENTS 7,418,404 B2 * 8/2008 Mori ................... G06Q 30/0633
705/26.8
10,909,624 B2 * 2/2021 Shirazi ................... G06Q 40/06
(Continued)

FOREIGN PATENT DOCUMENTS

JP    2009-187151 A    8/2009
JP    2009-265747 A    11/2009
(Continued)

OTHER PUBLICATIONS

International Search Report of PCT/JP2018/025245 dated Sep. 4, 2018 [PCT/ISA/210].

*Primary Examiner* — Garcia Ade
(74) *Attorney, Agent, or Firm* — Sughrue Mion, PLLC

(57) ABSTRACT

A first safety stock quantity calculation unit 81 calculates a safety stock quantity of a commodity at a first elapse time that is a time when a unit delivery time period has elapsed from one delivery time, the unit delivery time period being a unit of a delivery interval. A second safety stock quantity calculation unit 82 calculates a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period. A recommended order quantity calculation unit 83 calculates a recommended order quantity of the commodity, based on the safety stock quantity of the commodity at the second elapse time. In the case where prediction is made that a stock quantity at the first
(Continued)

elapse time is less than the safety stock quantity at the first elapse time, the second safety stock quantity calculation unit 82 calculates a safety stock quantity of the commodity at a time when the coverage time period has elapsed from the first elapse time.

13 Claims, 9 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2011/0246215 A1* | 10/2011 | Postma | G06Q 10/087 705/2 |
| 2012/0316919 A1* | 12/2012 | Vardar | G06Q 30/0283 705/7.31 |
| 2014/0279204 A1* | 9/2014 | Roketenetz | G06Q 30/0631 705/26.7 |
| 2016/0350832 A1* | 12/2016 | Franklin | G06Q 30/0633 |
| 2018/0033076 A1* | 2/2018 | Roundtree | G06K 7/1413 |

FOREIGN PATENT DOCUMENTS

| | | |
|---|---|---|
| JP | 2010-250668 A | 11/2010 |
| JP | 2017-102570 A | 6/2017 |

* cited by examiner

RECOMMENDED ORDER QUANTITY DETERMINING DEVICE, RECOMMENDED ORDER QUANTITY DETERMINATION METHOD, AND RECOMMENDED ORDER QUANTITY DETERMINATION PROGRAM

CROSS REFERENCE TO RELATED APPLICATIONS

This application is a National Stage of International Application No. PCT/JP2018/025245, filed Jul. 3, 2018, claiming priority to Japanese Patent Application No. 2017-184976, filed Sep. 26, 2017, the contents of all of which are incorporated herein by reference in their entirety.

TECHNICAL FIELD

The present invention relates to a recommended order quantity determining device, a recommended order quantity determination method, and a recommended order quantity determination program for determining the recommended order quantity of a commodity.

BACKGROUND ART

To reduce unnecessary stock and stockouts, various methods of appropriately recommending the order quantity of each commodity have been proposed. For example, Patent Literature (PTL) 1 describes an inventory management system that, in the case where delivery or ordering of an article is performed on a regular basis, determines the order quantity of the article more accurately. The system described in PTL 1 predicts demand in a prediction target period that is a period from the delivery time in response to an order to the next delivery time.

CITATION LIST

Patent Literature

PTL 1: Japanese Patent Application Laid-Open No. 2009-187151

SUMMARY OF INVENTION

Technical Problem

With importance placed on preventing stockouts, a commodity is typically ordered at each order timing. For example, the system described in PTL 1 is based on the premise that a commodity is ordered on a regular basis. Meanwhile, various commodities which are ordered include commodities having long periods to disposal (hereafter referred to as "long freshness commodities"). A long freshness commodity can be sold in a store for a long period of time. In some cases, however, pieces that differ slightly in disposal time limit are displayed on shelves as the long freshness commodity.

FIG. 11 is an explanatory diagram depicting an example of the transition of the stock quantity of a long freshness commodity. For example, suppose, despite the commodity delivered at delivery timings N-4 to N-1 remaining, the commodity is newly delivered at the timing of delivery N. In this case, pieces with five types of disposal time limits are in stock as the commodity.

In such a state in which pieces of a commodity with a plurality of types of disposal time limits are displayed on shelves, first-in first-out in the store tends to be disrupted, which is likely to increase prediction errors. Besides, the time and trouble for rearranging the pieces of the commodity to enable first-in first-out in the store increase. Furthermore, since the commodity with a long period to the disposal time limit is preferentially selected, the risk of disposal loss increases.

The system described in PTL 1 fails to assume such situations. It is therefore desirable to appropriately recommend the order quantity of a commodity while suppressing a situation in which pieces of the commodity that differ slightly in disposal time limit are in stock.

The present invention therefore has an object of providing a recommended order quantity determining device, a recommended order quantity determination method, and a recommended order quantity determination program that can recommend appropriate order quantity of a commodity while suppressing an increase in the number of pieces of the commodity with different disposal time limits.

Solution to Problem

A recommended order quantity determining device according to the present invention includes: a first safety stock quantity calculation unit which calculates a safety stock quantity of a commodity at a first elapse time that is a time when a unit delivery time period has elapsed from one delivery time, the unit delivery time period being a unit of a delivery interval; a second safety stock quantity calculation unit which calculates a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and a recommended order quantity calculation unit which calculates a recommended order quantity of the commodity, based on the safety stock quantity of the commodity at the second elapse time, wherein in the case where prediction is made that a stock quantity at the first elapse time is less than the safety stock quantity at the first elapse time, the second safety stock quantity calculation unit calculates a safety stock quantity of the commodity at a time when the coverage time period has elapsed from the first elapse time.

A recommended order quantity determination method according to the present invention includes: calculating a safety stock quantity of a commodity at a first elapse time that is a time when a unit delivery time period has elapsed from one delivery time, the unit delivery time period being a unit of a delivery interval; calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and calculating a recommended order quantity of the commodity, based on the safety stock quantity of the commodity at the second elapse time, wherein in the case where prediction is made that a stock quantity at the first elapse time is less than the safety stock quantity at the first elapse time, a safety stock quantity of the commodity at a time when the coverage time period has elapsed from the first elapse time is calculated.

A recommended order quantity determination program according to the present invention causes a computer to execute: a first safety stock quantity calculation process of calculating a safety stock quantity of a commodity at a first elapse time that is a time when a unit delivery time period has elapsed from one delivery time, the unit delivery time period being a unit of a delivery interval; a second safety stock quantity calculation process of calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and a recommended order quantity calculation process of calculating a recommended order quantity of the commodity, based on the safety stock quantity of the commodity at the second elapse time, wherein in the second safety stock quantity calculation process, in the case where prediction is made that a stock quantity at the first elapse time is less than the safety stock quantity at the first elapse time, the computer is caused to calculate a safety stock quantity of the commodity at a time when the coverage time period has elapsed from the first elapse time.

Advantageous Effects of Invention

According to the present invention, it is possible to recommend appropriate order quantity of a commodity while suppressing an increase in the number of pieces of the commodity with different disposal time limits.

DESCRIPTION OF EMBODIMENT

An exemplary embodiment of the present invention will be described below, with reference to the drawings.

Figure 1:
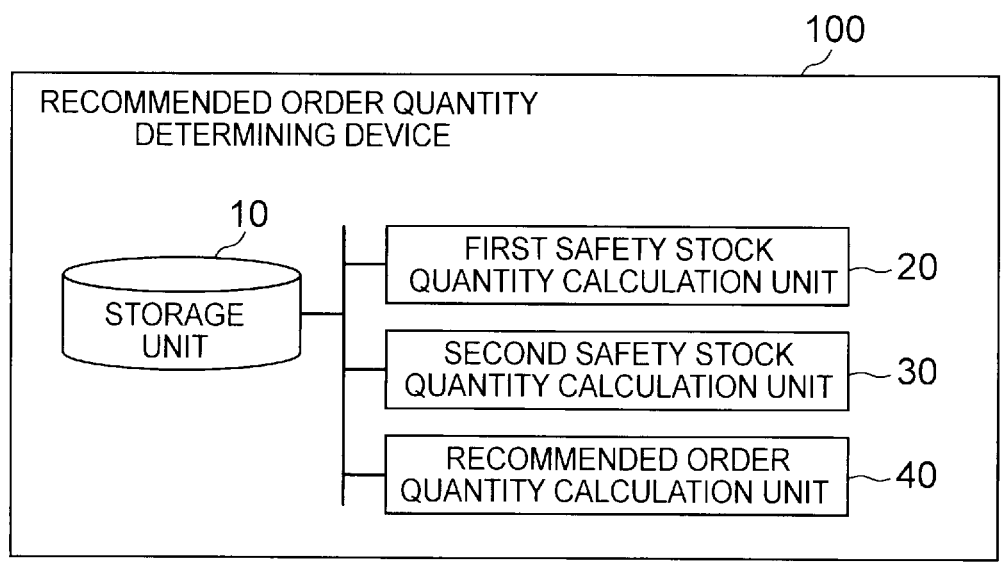
FIG. 1 is a block diagram depicting an exemplary embodiment of a recommended order quantity determining device according to the present invention.

FIG. 1 is a block diagram depicting an exemplary embodiment of a recommended order quantity determining device according to the present invention. A recommended order quantity determining device 100 according to this exemplary embodiment includes a storage unit 10, a first safety stock quantity calculation unit 20, a second safety stock quantity calculation unit 30, and a recommended order quantity calculation unit 40.

The recommended order quantity determining device 100 according to this exemplary embodiment, instead of ordering a commodity in a small quantity at each order timing, collectively places a plurality of orders all at once, in order to suppress a situation in which pieces of the commodity that differ slightly in disposal time limit are in stock. In the following description, it is assumed that an order is placed every day (at daily intervals), for ease of explanation. The order interval is, however, not limited to one day. In the following description, one delivery interval is referred to as "unit delivery time period". That is, the unit delivery time period is the delivery interval unit, and can be also referred to as "periodic order interval".

The commodity in this exemplary embodiment is a long freshness commodity with a long period to disposal. Herein, the "long freshness commodity" denotes a commodity whose period from delivery to disposal (hereafter referred to as "sales permission time period") is longer than twice the unit delivery time period. In other words, the "long freshness commodity" is a commodity that is orderable at each order timing but has no problem in terms of its sales permission time period even when not ordered at each time. Specifically, for example, in the case where the unit delivery time period is one day, a commodity whose sales permission time period is longer than two days is a long freshness commodity. Examples of the long freshness commodity include milk, yogurt, and a single item of snack.

Figure 2:
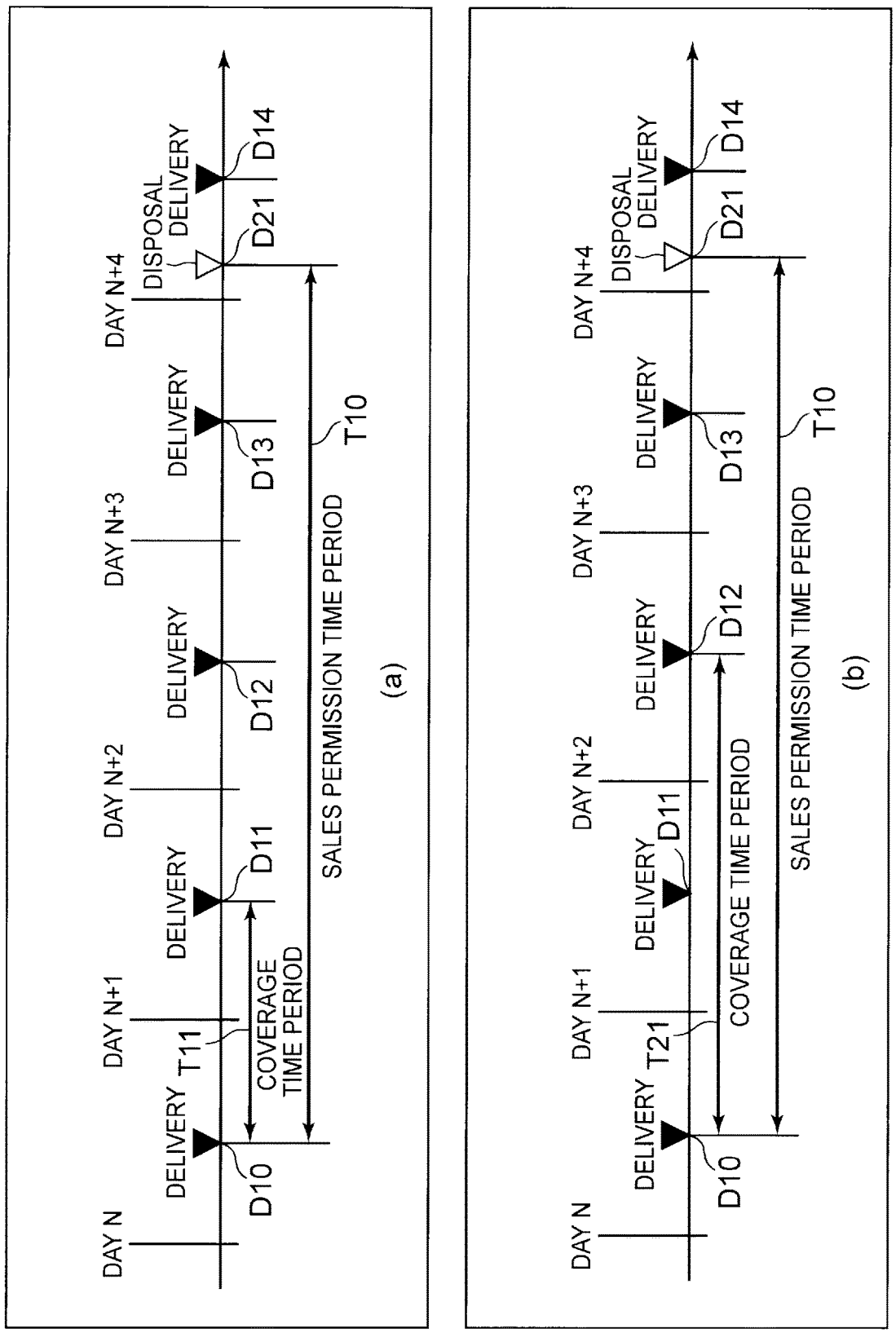
FIG. 2 is an explanatory diagram depicting an example of a process of collectively placing orders.

FIG. 2 is an explanatory diagram depicting an example of a process of collectively placing orders. (a) in FIG. 2 depicts an example of a typical commodity order process of ordering a commodity at each time (i.e. per one unit delivery time period). (b) in FIG. 2 depicts an example of a long freshness commodity order process of combining a plurality of orders (i.e. combining orders for a period combining a plurality of unit delivery time periods). In the example depicted in FIG. 2, the period from the time of delivery D10 to disposal D21 is the sales permission time period.

In the following description, the delivery interval of a typical commodity (i.e. the delivery interval at each time) is referred to as "unit delivery time period", and the delivery interval of a long freshness commodity is referred to as "coverage time period", to distinguish the delivery interval of a typical commodity and the delivery interval of a long freshness commodity from each other. In the example depicted in (a) in FIG. 2, periods such as the period from delivery D10 to delivery D11 and the period from delivery D11 to delivery D12 each represent the unit delivery time period.

For a typical commodity, interval T11 from delivery D10 to next delivery D11 corresponds to the coverage time period (although it is referred to as "unit delivery time period" in the following description), as depicted in (a) in FIG. 2. That is, the typical commodity is ordered per one unit delivery time period (i.e. the timings of delivery D10, D11, D12, D13, D14, . . . ). In this exemplary embodiment, on the other hand, interval T21 combining a plurality of unit delivery time periods (i.e. the period from delivery D10 to delivery D12) corresponds to the coverage time period, and the commodity is ordered at this interval, as depicted in (b) in FIG. 2.

In the following description, the time when the unit delivery time period has elapsed from a delivery time as the starting point is referred to as "first elapse time", and the time when the coverage time period has elapsed from the delivery time as the starting point is referred to as "second elapse time". In the example depicted in FIG. 2, when the delivery time as the starting point is D10, the first elapse time is the time of delivery D11, and the second elapse time is the time of delivery D12.

The storage unit 10 stores various information necessary for the below-described processes. The storage unit 10 may store, for example, the sales permission time period of each commodity and the below-described demand prediction quantity of each commodity. For example, the storage unit 10 is implemented by a magnetic disk or the like.

The first safety stock quantity calculation unit 20 calculates the safety stock quantity of each commodity at the time (i.e. first elapse time) when the unit delivery time period has elapsed from a delivery time. The safety stock quantity is a stock quantity for absorbing fluctuations in demand prediction, and can be regarded as the quantity of stock accumulated so as to avoid both disposal and a stockout. The first safety stock quantity calculation unit 20 may accordingly calculate the safety stock quantity from an error in demand prediction. An example of the method of calculating the safety stock quantity will be described in detail below.

First, the first safety stock quantity calculation unit 20 calculates demand prediction quantity in the unit delivery time period. Any method may be used to calculate the demand prediction quantity. For example, the first safety stock quantity calculation unit 20 may calculate the demand prediction quantity using a prediction model for predicting demand quantity. As the prediction model, for example, a prediction model that predicts the demand quantity in commodity category unit (category demand prediction quantity) on a daily basis is used. In this case, the first safety stock quantity calculation unit 20 first summarizes the most recent sales results in category unit, and calculates an hourly sales composition ratio. The first safety stock quantity calculation unit 20 then multiplies the daily prediction result by the calculated sales composition ratio as an hourly proportional distribution ratio, to calculate the category demand prediction quantity on an hourly basis.

In this case, the first safety stock quantity calculation unit 20 calculates the demand prediction quantity of each single commodity from the category demand prediction quantity calculated on an hourly basis. For example, the first safety stock quantity calculation unit 20 may calculate the demand prediction quantity of each single commodity by proportionally distributing the category demand prediction quantity from the past results (sales composition ratio) of each commodity.

Next, the first safety stock quantity calculation unit 20 calculates an error in the demand quantity predicted by the prediction model. Specifically, the first safety stock quantity calculation unit 20 calculates a daily error of the prediction model, from the demand prediction quantity in the coverage time period and the demand prediction quantity in the sales permission time period calculated for each commodity. The first safety stock quantity calculation unit 20 calculates the error in the demand quantity by cross validation or the like based on past result data present at the time of generation of the prediction model, instead of calculating the error by comparing the demand result quantity and the demand prediction quantity as described in, for example, PTL 1.

First, the first safety stock quantity calculation unit 20 calculates a relative error on a daily basis, using data in a determination segment. For example, the relative error is calculated according to the following Formula 1. The first safety stock quantity calculation unit 20 may exclude data of a date with a sales result (+ chance loss) of "0", from the calculation. In the case where chance loss can be acquired, the first safety stock quantity calculation unit 20 may use a value obtained by adding the chance loss to the sales result.

Relative error=(demand prediction quantity in determination segment−sales result(+chance loss) in determination segment)/sales result(+chance loss) in determination segment  (Formula 1).

The first safety stock quantity calculation unit 20 calculates a mean of the relative errors calculated on a daily basis. For example, the relative error mean is calculated according to the following Formula 2.

Relative error mean=(Σ relative error)/the number of days in determination segment  (Formula 2).

The first safety stock quantity calculation unit 20 also calculates a standard deviation of the relative errors. In detail, the first safety stock quantity calculation unit 20 calculates the variation of the demand prediction quantity from the mean. For example, the relative error standard deviation is calculated according to the following Formula 3.

Relative error standard deviation=(Σ(sales result(+chance loss) in determination segment−relative error mean)/(the number of days in determination segment)^½)  (Formula 3).

Next, the first safety stock quantity calculation unit 20 calculates an error of the demand prediction quantity in the unit delivery time period, based on the calculated relative error mean and relative error standard deviation of the prediction model. Specifically, the first safety stock quantity calculation unit 20 calculates a demand prediction quantity mean and a demand prediction quantity standard deviation in the unit delivery time period.

Figure 3:
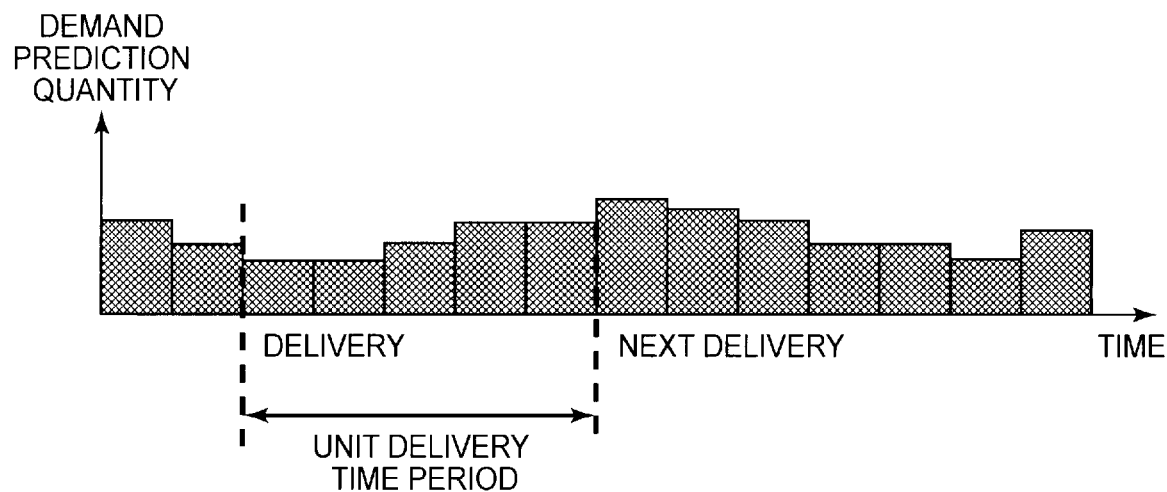
FIG. 3 is an explanatory diagram depicting an example of demand prediction quantity in a unit delivery time period.

FIG. 3 is an explanatory diagram depicting an example of the demand prediction quantity in the unit delivery time period. FIG. 3 depicts an example in which the demand prediction quantity is calculated on an hourly basis. In this case, since the period from delivery to next delivery represents the unit delivery time period, the sum total of the demand prediction quantities in this period represents the demand prediction quantity in the unit delivery time period.

For example, the demand prediction quantity mean $\sigma_1$ in the unit delivery time period is calculated according to the following Formula 4, and the demand prediction quantity standard deviation $\mu_1$ in the unit delivery time period is calculated according to the following Formula 5.

Demand prediction quantity mean ($\sigma_1$) in unit delivery time period=unit delivery time period demand prediction quantity+unit delivery time period demand prediction quantity×relative error mean  (Formula 4).

Demand prediction quantity standard deviation ($\mu_1$) in unit delivery time period=unit delivery time period demand prediction mean×relative error standard deviation  (Formula 5).

Likewise, the first safety stock quantity calculation unit 20 calculates an error of the demand prediction quantity in the sales permission time period, based on the calculated relative error mean and relative error standard deviation of the prediction model. Specifically, the first safety stock quantity calculation unit 20 calculates a demand prediction quantity mean and a demand prediction quantity standard deviation in the sales permission time period.

Figure 4:
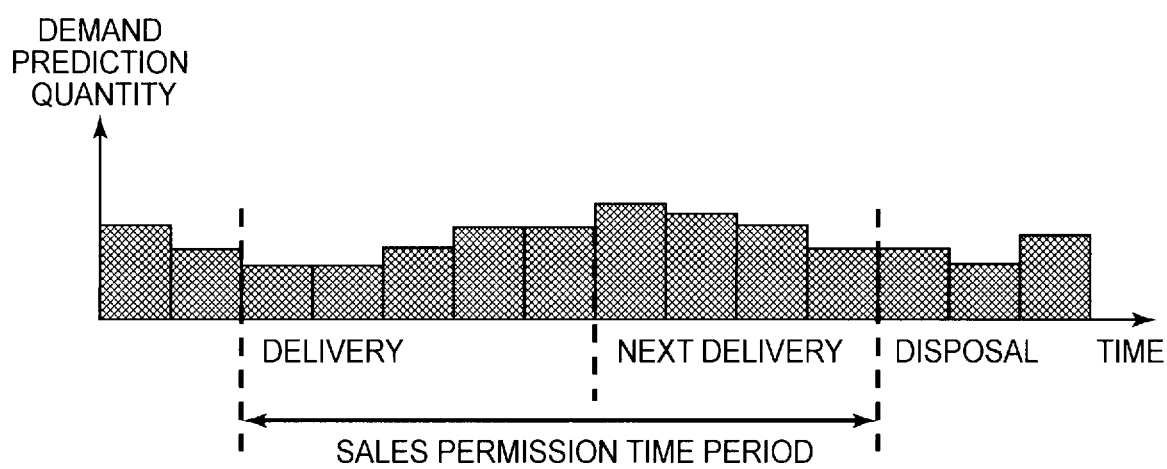
FIG. 4 is an explanatory diagram depicting an example of demand prediction quantity in a sales permission time period.

FIG. 4 is an explanatory diagram depicting an example of the demand prediction quantity in the sales permission time period. FIG. 4 depicts an example in which the demand prediction quantity is calculated on an hourly basis, as in FIG. 3. In this case, since the period from delivery to disposal represents the sales permission time period, the sum total of the demand prediction quantities in this period represents the demand prediction quantity in the sales permission time period.

For example, the demand prediction quantity mean $\sigma_2$ in the sales permission time period is calculated according to the following Formula 6, and the demand prediction quantity standard deviation $\mu_2$ in the sales permission time period is calculated according to the following Formula 7.

Demand prediction quantity mean ($\sigma_2$) in sales permission time period=sales permission time period demand prediction quantity+sales permission time period demand prediction quantity×relative error mean  (Formula 6).

Demand prediction quantity standard deviation ($\mu_2$) in sales permission time period=sales permission time period demand prediction mean×relative error standard deviation  (Formula 7).

The first safety stock quantity calculation unit 20 calculates the safety stock quantity of each commodity, using the calculated daily error. First, the first safety stock quantity calculation unit 20 calculates the occurrence probability of the demand prediction quantity in the unit delivery time period, from the demand prediction quantity mean and the demand prediction quantity standard deviation in the unit delivery time period. Specifically, the first safety stock quantity calculation unit 20 generates a normal distribution indicating the occurrence probability for each commodity, from the demand prediction quantity mean and the demand prediction quantity standard deviation in the unit delivery time period.

Likewise, the first safety stock quantity calculation unit 20 calculates the occurrence probability of the demand prediction quantity in the sales permission time period, from the demand prediction quantity mean and the demand prediction quantity standard deviation in the sales permission time period. Specifically, the first safety stock quantity calculation unit 20 generates a normal distribution indicating the occurrence probability for each commodity, from the demand prediction quantity mean and the demand prediction quantity standard deviation in the sales permission time period.

The first safety stock quantity calculation unit 20 calculates appropriate safety stock quantity, based on the calculated two occurrence probabilities (the occurrence probability of the demand prediction quantity in the unit delivery time period and the occurrence probability of the demand prediction quantity in the sales permission time period). The first safety stock quantity calculation unit 20 may determine the safety stock quantity, based on demand prediction quantity at which the occurrence probability of the demand prediction quantity in the unit delivery time period and the occurrence probability of the demand prediction quantity in the sales permission time period match (that is, demand prediction quantity at an intersection point of the generated two normal distributions).

The intersection point of the two normal distributions can be calculated according to the following Formula 8. In Formula 8, x denotes [demand prediction quantity+safety stock quantity] in the unit delivery time period.

[Math. 1]

$$\frac{1}{\sqrt{2\pi\sigma_1^2}}\exp\left(-\frac{(x-\mu_1)^2}{2\sigma_1^2}\right) = \frac{1}{\sqrt{2\pi\sigma_2^2}}\exp\left(-\frac{(x-\mu_2)^2}{2\sigma_2^2}\right) \quad \text{(Formula 8)}$$

The first safety stock quantity calculation unit 20 calculates the safety stock quantity, as the difference between the demand prediction quantity at the intersection point and the demand prediction quantity in the unit delivery time period (safety stock quantity=demand prediction quantity at intersection point—demand prediction quantity in unit delivery time period).

The second safety stock quantity calculation unit 30 calculates the safety stock quantity of each commodity at the time (i.e. second elapse time) when the coverage period has elapsed from the delivery time. The coverage time period of each commodity is determined depending on the sales permission time period. The second safety stock quantity calculation unit 30 may, for example, determine that the number of unit delivery time periods calculated by (sales permission time period)/2 (round up to the whole number) is to be combined as the coverage time period. For example, suppose the unit delivery time period is one day and the sales permission time period is three days. Then, the number of days combined is calculated at two days.

Here, the coverage time period is preferably not excessively long, in terms of accumulation, commodity replacement, and overstock prevention. Accordingly, the second safety stock quantity calculation unit 30 may determine the coverage time period so that the number of unit delivery time periods combined is not greater than a predetermined number. For example, in the case where the predetermined number of unit delivery time periods combined is 3 (i.e. three days), the second safety stock quantity calculation unit 30 may determine that the coverage time period is three days, even if the calculated coverage time period is more than three days.

The second safety stock quantity calculation unit 30 may calculate the occurrence probability of the demand prediction quantity in the coverage time period and the occurrence probability of the demand prediction quantity in the sales permission time period and calculate the safety stock quantity from the calculated two occurrence probabilities, as with the method whereby the first safety stock quantity calculation unit 20 calculates the safety stock quantity. Specifically, the second safety stock quantity calculation unit 30 may determine the safety stock quantity, based on demand prediction quantity at which the occurrence probability of the demand prediction quantity in the coverage time period and the occurrence probability of the demand prediction quantity in the sales permission time period match.

Figure 5:
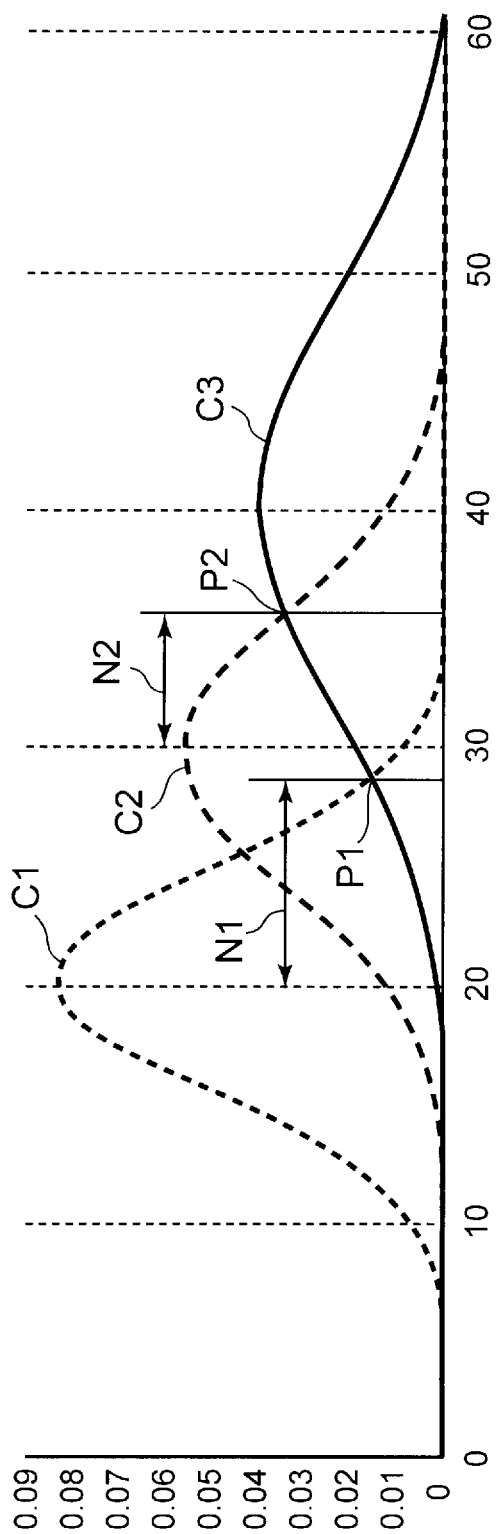
FIG. 5 is an explanatory diagram depicting an example of a process of calculating safety stock quantity.

FIG. 5 is an explanatory diagram depicting an example of a process of calculating safety stock quantity. In FIG. 5, curve C1 is a normal distribution representing the occurrence probability of the demand prediction quantity in the unit delivery time period, curve C2 is a normal distribution representing the occurrence probability of the demand prediction quantity in the coverage time period, and curve C3 is a normal distribution representing the occurrence probability of the demand prediction quantity in the sales permission time period.

In the example depicted in FIG. 5, the demand prediction quantity in the unit delivery time period is 20, the demand prediction quantity in the coverage time period is 30, and the demand prediction quantity in the sales permission time period is 40. The safety stock quantity at the first elapse time is calculated at N1, i.e. the difference between the demand prediction quantity at intersection point P1 between curve C1 and curve C3 and the demand prediction quantity (20) in the unit delivery time period. The safety stock quantity at the second elapse time is calculated at N2, i.e. the difference between the demand prediction quantity at intersection point P2 between curve C2 and curve C3 and the demand prediction quantity (40) in the coverage time period.

The recommended order quantity calculation unit 40 calculates the recommended order quantity of each commodity, based on the safety stock quantity of the commodity at the second elapse time. Specifically, the recommended order quantity calculation unit 40 calculates the recommended order quantity of the commodity, from the stock quantity at a delivery time, the demand prediction quantity in the coverage time period, and the safety stock quantity of the commodity at the second elapse time.

Figure 6:
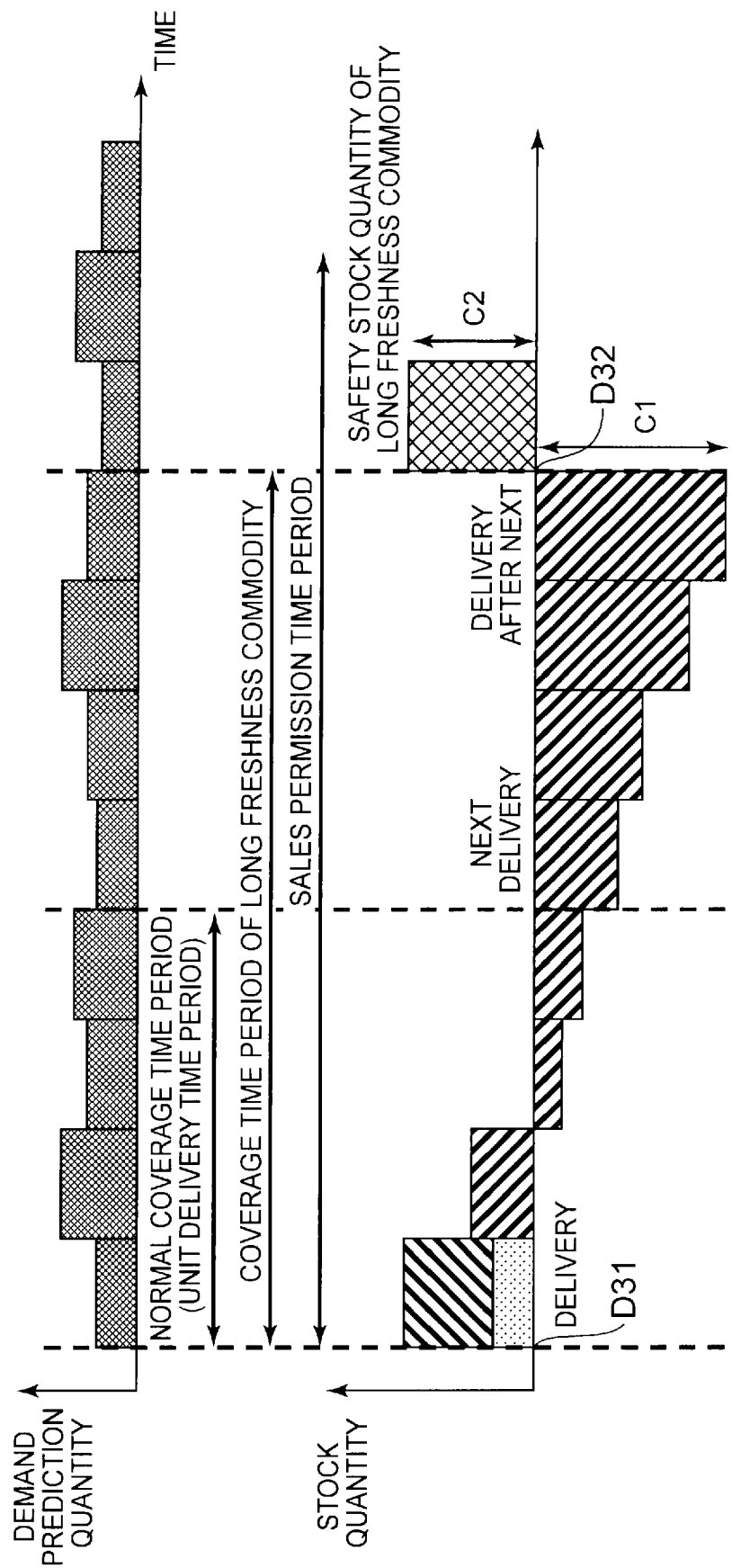
FIG. 6 is an explanatory diagram depicting an example of a process of calculating recommended order quantity.

FIG. 6 is an explanatory diagram depicting an example of a process of calculating recommended order quantity. For example, suppose the demand prediction quantity of a long freshness commodity is calculated as depicted in FIG. 6. Here, each bar graph indicates hourly demand prediction quantity. In the example depicted in FIG. 6, four bar graphs represent a normal coverage time period (i.e. unit delivery time period). Also suppose the coverage time period of the long freshness commodity is twice the unit delivery time period (i.e. a period combining two unit delivery time periods), and the sales permission time period of the long freshness commodity is at least twice the unit delivery time period.

It is predicted that, if the demand prediction quantity in the coverage time period is subtracted from the stock quantity at delivery D31 each time, a shortage of stock quantity of C1 occurs at the time of delivery D32 after next. Suppose the safety stock quantity of the long freshness commodity at the time of delivery D32 (i.e. second elapse time) is calculated at C2. In this case, the recommended order quantity calculation unit 40 calculates the recommended order quantity at C1+C2. By calculating the recommended order quantity in this way, a plurality of orders can be collectively placed.

Figure 7:
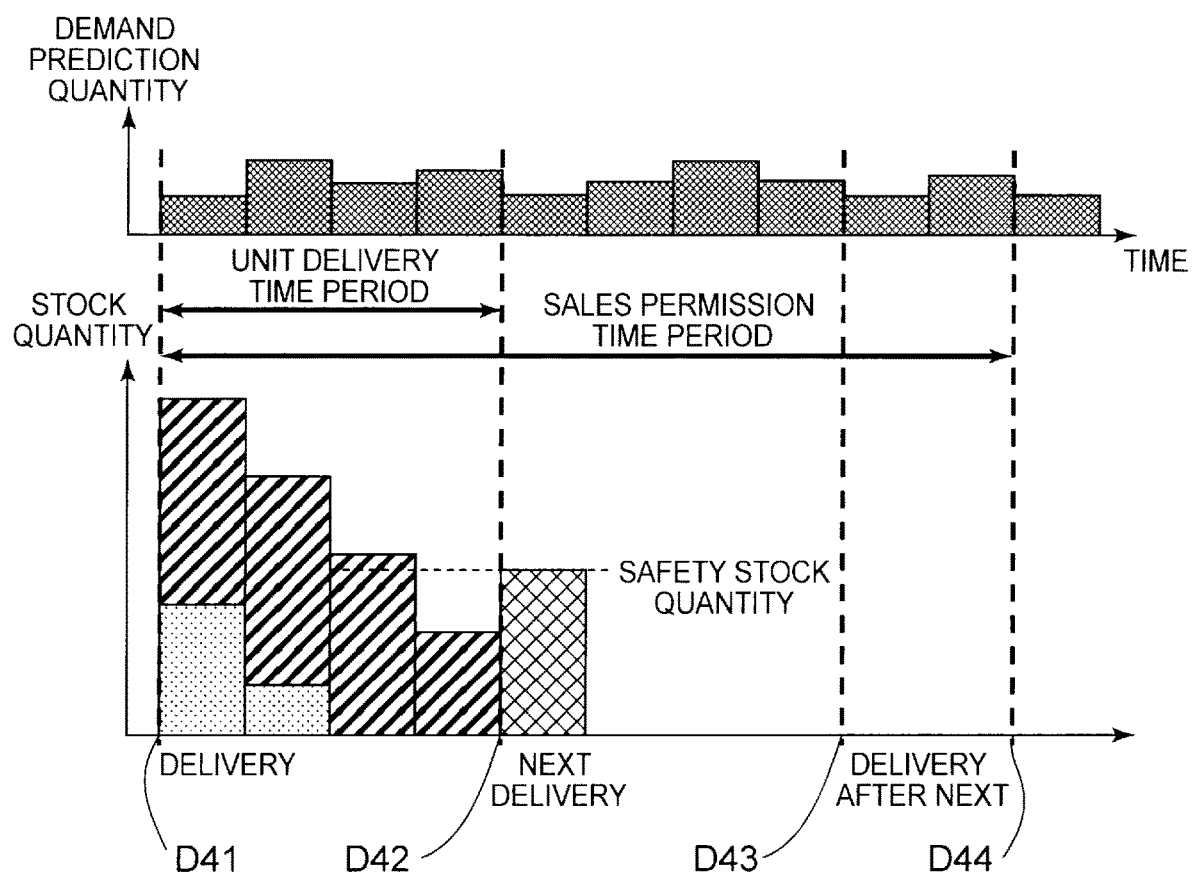
FIG. 7 is an explanatory diagram depicting an example of a trigger of calculating the order quantity of a long freshness commodity.

In some cases, however, the stock quantity decreases considerably depending on the transition of demand. In view of this, the timing of calculating the recommended order quantity may be determined depending on the safety stock quantity calculated for each normal coverage time period (i.e. the safety stock quantity at the first elapse time). FIG. 7 is an explanatory diagram depicting an example of a trigger of calculating the order quantity of the long freshness commodity.

To determine the order quantity at the time of delivery D41 in FIG. 7, the second safety stock quantity calculation unit 30 calculates the safety stock quantity at the time of delivery D43 (second elapse time). The recommended order quantity calculation unit 40 then calculates the recommended order quantity of the commodity, as a result of which the commodity is ordered. In addition, the first safety stock quantity calculation unit 20 calculates the safety stock quantity at the time of delivery D42 (first elapse time).

Suppose prediction is made that the stock quantity at the time of delivery D42 is less than the safety stock quantity at the first elapse time, when demand prediction quantity is taken into account. In such a case, the second safety stock quantity calculation unit 30 accelerates the calculation of the recommended order quantity at the time of delivery D43, to calculate, at the time of delivery D42, the safety stock quantity at the time of delivery D44 (hereafter referred to as "third elapse time") after the coverage time period elapses. The recommended order quantity calculation unit 40 then calculates the recommended order quantity of the commodity, based on the safety stock quantity of the commodity at the third elapse time.

Figure 8:
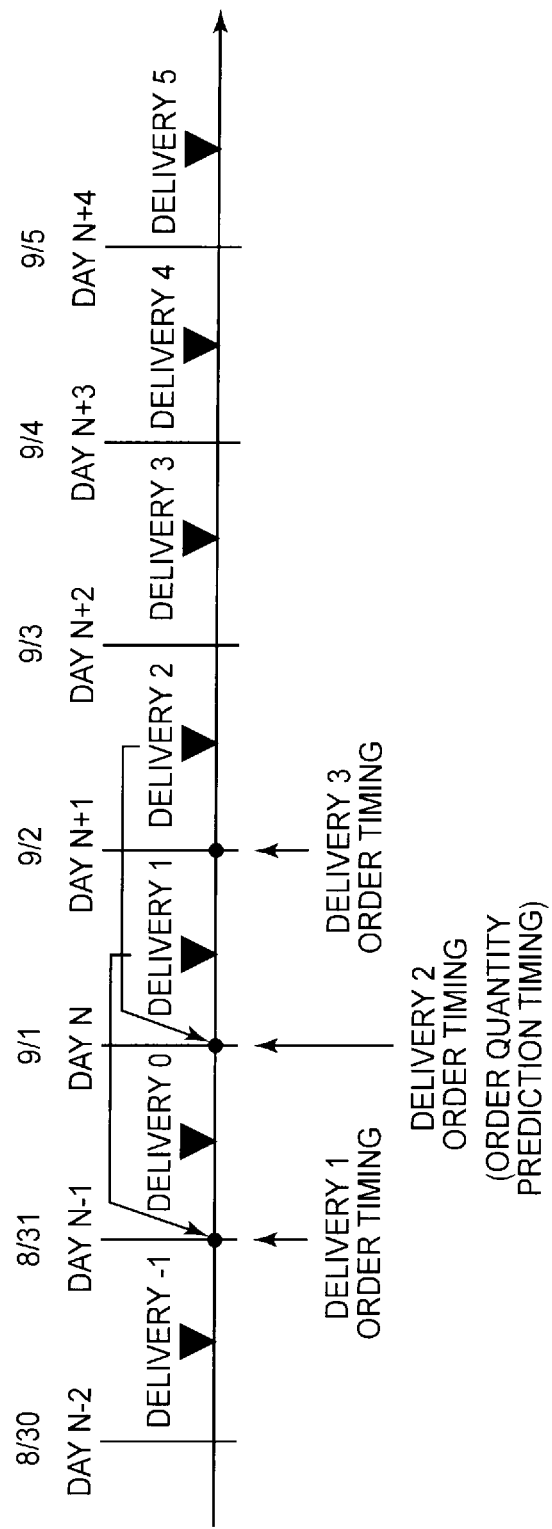
FIG. 8 is an explanatory diagram depicting an example of prediction and order timings.

This operation will be described in detail below, using a specific example. FIG. 8 is an explanatory diagram depicting an example of prediction and order timings. In the case where delivery is made per one day, delivery is normally made on the next day of an order, as depicted in FIG. 8. For example, in the case where an order is placed on August 31, delivery is made at the timing of delivery 1 on the next day (September 1). Likewise, in the case where an order is placed on September 1, delivery is made at the timing of delivery 2 on the next day (September 2). In the case where an order is placed on September 2, delivery is made at the timing of delivery 3 on the next day (September 3).

In this exemplary embodiment, for example, on September 1, the first safety stock quantity calculation unit 20 calculates the safety stock quantity at the time of delivery 2, and the second safety stock quantity calculation unit 30 calculates the safety stock quantity at the time of delivery 3. The recommended order quantity calculation unit 40 then calculates the recommended order quantity on September 1, based on the safety stock quantity at the time of delivery 3. In this case, delivery for two days is collectively made at the time of delivery 2.

Meanwhile, the second safety stock quantity calculation unit 30 determines whether the stock quantity on September 2 (at the time of delivery 2) is less than the safety stock quantity on September 2, based on the demand prediction quantity from September 1 to September 2. In the case where the stock quantity is less than the safety stock quantity, it is preferable to order the commodity without an interval. In this case, to determine the order quantity on September 2, the second safety stock quantity calculation unit 30 calculates the safety stock quantity on September 4, and the recommended order quantity calculation unit 40 calculates the recommended order quantity on September 2 based on the calculated safety stock quantity.

By calculating the safety stock quantity in the unit delivery time period in this way, an order can be placed according to demand.

The first safety stock quantity calculation unit 20, the second safety stock quantity calculation unit 30, and the recommended order quantity calculation unit 40 are implemented by a processor (e.g. CPU (central processing unit), GPU (graphics processing unit), FPGA (field-programmable gate array)) of a computer operating according to a program (recommended order quantity determination program).

For example, the program may be stored in the storage unit 10, with the processor reading the program and, according to the program, operating as the first safety stock quantity calculation unit 20, the second safety stock quantity calculation unit 30, and the recommended order quantity calculation unit 40. The functions of the recommended order quantity determining device may be provided in the form of SaaS (Software as a Service).

The first safety stock quantity calculation unit 20, the second safety stock quantity calculation unit 30, and the recommended order quantity calculation unit 40 may each be implemented by dedicated hardware. All or part of the components of each device may be implemented by general-purpose or dedicated circuitry, processors, or combinations thereof. They may be configured with a single chip, or configured with a plurality of chips connected via a bus. All or part of the components of each device may be implemented by a combination of the above-mentioned circuitry or the like and program.

In the case where all or part of the components of the recommended order quantity determining device is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-server system or a cloud computing system.

Figure 9:
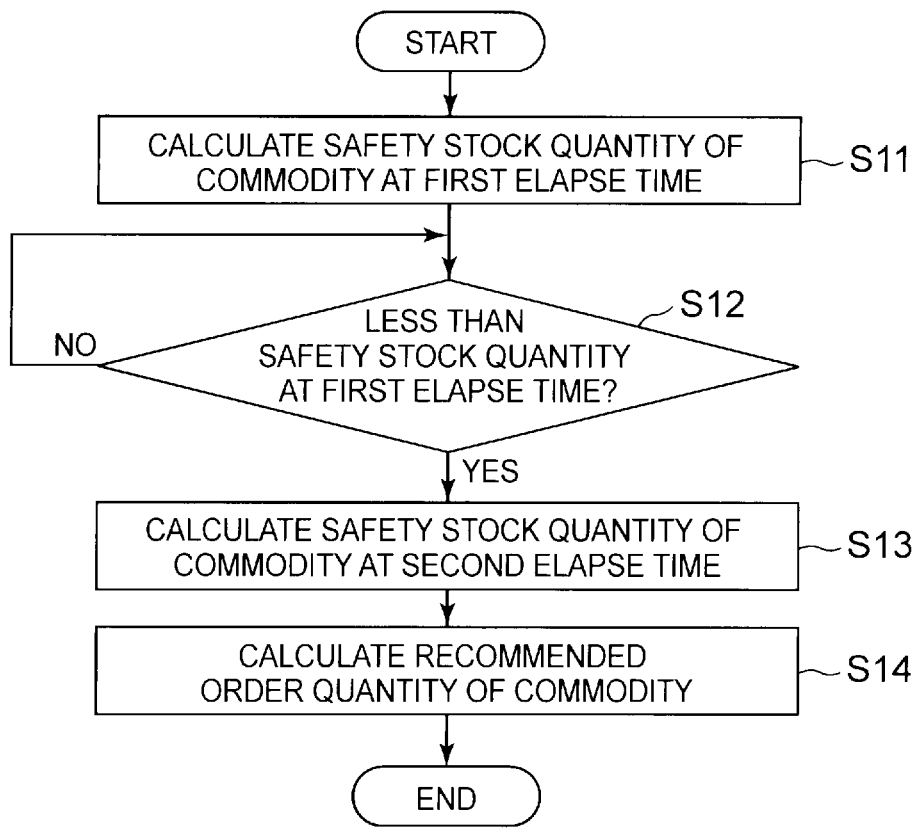
FIG. 9 is a flowchart depicting an example of the operation of the recommended order quantity determining device.

The operation of the recommended order quantity determining device according to this exemplary embodiment will be described below. FIG. 9 is a flowchart depicting an example of the operation of the recommended order quantity determining device according to this exemplary embodiment.

First, the first safety stock quantity calculation unit 20 calculates the safety stock quantity of a commodity at the first elapse time (step S11). Next, the second safety stock quantity calculation unit 20 determines whether the stock quantity is less than the calculated safety stock quantity of the commodity at the first elapse time (step S12). In the case where the stock quantity is predicted to be not less than the safety stock quantity (step S12: No), the process from step S12 is repeated.

In the case where the stock quantity is predicted to be less than the safety stock quantity (step S12: Yes), the second safety stock quantity calculation unit 30 calculates the safety stock quantity of the commodity at the second elapse time (step S13). The recommended order quantity calculation unit 40 then calculates the recommended order quantity of the commodity based on the safety stock quantity of the commodity at the second elapse time (step S14).

As described above, according to this exemplary embodiment, the first safety stock quantity calculation unit 20 calculates the safety stock quantity of the commodity at the first elapse time, and the second safety stock quantity calculation unit 30 calculates the safety stock quantity of the commodity at the second elapse time. The recommended order quantity calculation unit 40 then calculates the recommended order quantity of the commodity based on the safety stock quantity of the commodity at the second elapse time. Here, in the case where the stock quantity at the first elapse time is predicted to be less than the safety stock quantity at the first elapse time, the second safety stock quantity calculation unit 30 calculates the safety stock quantity of the commodity at the time when the coverage time period has elapsed from the first elapse time. Thus, appropriate order quantity of the commodity can be recommended while suppressing an increase in the number of pieces of the commodity with different disposal time limits. That is, while placing orders all at once at such a timing when collective ordering is possible, additional recommended order quantity can be calculated appropriately at such a timing when a stock shortage is likely to occur.

Figure 10:
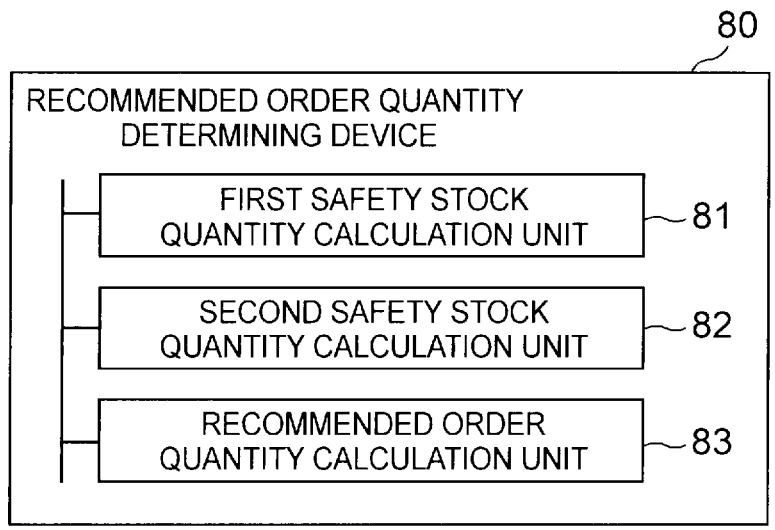
FIG. 10 is a block diagram depicting an overview of a recommended order quantity determining device according to the present invention.
Figure 11:
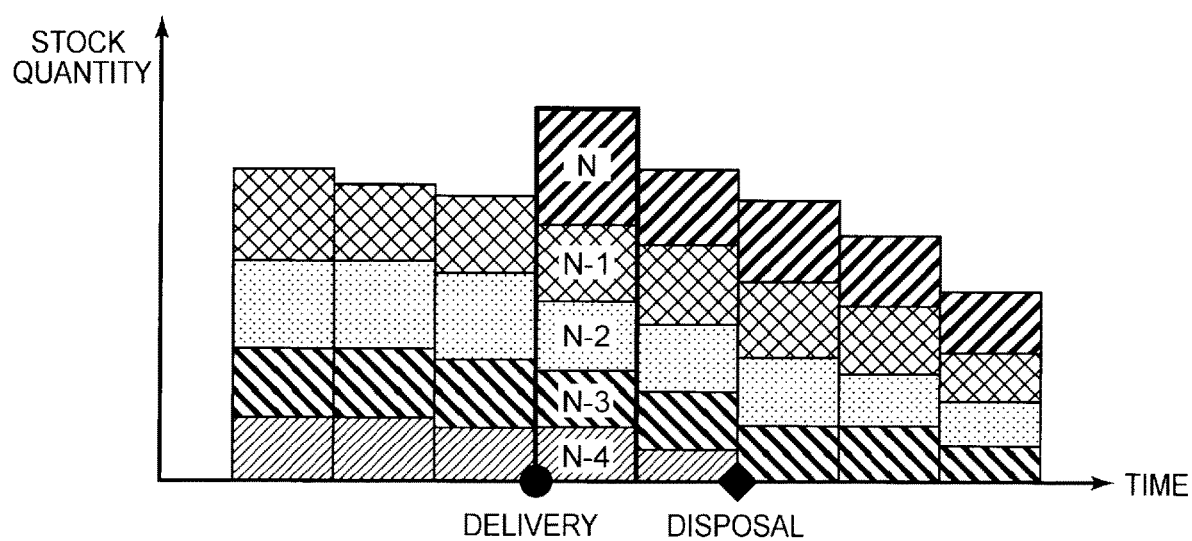
FIG. 11 is an explanatory diagram depicting an example of the transition of the stock quantity of a long freshness commodity.

An overview of the present invention will be given below. FIG. 10 is a block diagram depicting an overview of a recommended order quantity determining device according to the present invention. A recommended order quantity determining device 80 according to the present invention includes: a first safety stock quantity calculation unit 81 (e.g. the first safety stock quantity calculation unit 20) which calculates a safety stock quantity of a commodity at a first elapse time that is a time when a unit delivery time period has elapsed from one delivery time, the unit delivery time period being a unit of a delivery interval; a second safety stock quantity calculation unit 82 (e.g. the second safety stock quantity calculation unit 30) which calculates a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and a recommended order quantity calculation unit 83 (e.g. the recommended order quantity calculation unit 40) which calculates a recommended order quantity of the commodity, based on the safety stock quantity of the commodity at the second elapse time.

In the case where prediction is made that a stock quantity at the first elapse time is less than the safety stock quantity at the first elapse time, the second safety stock quantity calculation unit 82 calculates a safety stock quantity of the commodity at a time when the coverage time period has elapsed from the first elapse time.

With such a structure, appropriate order quantity of the commodity can be recommended while suppressing an increase in the number of pieces of the commodity with different disposal time limits.

The recommended order quantity calculation unit 83 may calculate the recommended order quantity of the commodity, from a stock quantity at the delivery time, a demand prediction quantity in the coverage time period, and the safety stock quantity of the commodity at the second elapse time.

The second safety stock quantity calculation unit 82 may calculate the safety stock quantity of the commodity at the second elapse time at which the coverage time period determined depending on a sales permission time period representing a period to disposal has elapsed.

The second safety stock quantity calculation unit 82 may calculate the safety stock quantity of the commodity at the second elapse time, using the coverage time period combining the number of unit delivery time periods that is not greater than a predetermined number.

The recommended order quantity calculation unit 83 may calculate a recommended order quantity of a long freshness commodity which is a commodity whose sales permission time period representing a period to disposal is longer than twice the unit delivery time period.

The first safety stock quantity calculation unit 81 may calculate an occurrence probability of a demand prediction quantity in the unit delivery time period and an occurrence probability of a demand prediction quantity in a sales permission time period representing a period to disposal, and calculates the safety stock quantity from the calculated two occurrence probabilities.

The first safety stock quantity calculation unit 81 may determine the safety stock quantity, based on a demand prediction quantity at which the occurrence probability of the demand prediction quantity in the unit delivery time period and the occurrence probability of the demand prediction quantity in the sales permission time period match.

The second safety stock quantity calculation unit 82 may calculate an occurrence probability of a demand prediction quantity in the coverage time period and an occurrence probability of a demand prediction quantity in a sales permission time period representing a period to disposal, and calculates the safety stock quantity from the calculated two occurrence probabilities.

The foregoing exemplary embodiment can be wholly or partly described as, but is not limited to, the following supplementary notes.

(Supplementary note 1) A recommended order quantity determining device including: a first safety stock quantity calculation unit which calculates a safety stock quantity of a commodity at a first elapse time that is a time when a unit delivery time period has elapsed from one delivery time, the unit delivery time period being a unit of a delivery interval; a second safety stock quantity calculation unit which calculates a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and a recommended order quantity calculation unit which calculates a recommended order quantity of the commodity, based on the safety stock quantity of the commodity at the second elapse time, wherein in the case where prediction is made that a stock quantity at the first elapse time is less than the safety stock quantity at the first elapse time, the second safety stock quantity calculation unit calculates a safety stock quantity of the commodity at a time when the coverage time period has elapsed from the first elapse time.

(Supplementary note 2) The recommended order quantity determining device according to supplementary note 1, wherein the recommended order quantity calculation unit calculates the recommended order quantity of the commodity, from a stock quantity at the delivery time, a demand prediction quantity in the coverage time period, and the safety stock quantity of the commodity at the second elapse time.

(Supplementary note 3) The recommended order quantity determining device according to supplementary note 1 or 2, wherein the second safety stock quantity calculation unit calculates the safety stock quantity of the commodity at the second elapse time at which the coverage time period determined depending on a sales permission time period representing a period to disposal has elapsed.

(Supplementary note 4) The recommended order quantity determining device according to supplementary note 3, wherein the second safety stock quantity calculation unit calculates the safety stock quantity of the commodity at the second elapse time, using the coverage time period combining the number of unit delivery time periods that is not greater than a predetermined number.

(Supplementary note 5) The recommended order quantity determining device according to any one of supplementary notes 1 to 4, wherein the recommended order quantity calculation unit calculates a recommended order quantity of a long freshness commodity which is a commodity whose sales permission time period representing a period to disposal is longer than twice the unit delivery time period.

(Supplementary note 6) The recommended order quantity determining device according to any one of supplementary notes 1 to 5, wherein the first safety stock quantity calculation unit calculates an occurrence probability of a demand prediction quantity in the unit delivery time period and an occurrence probability of a demand prediction quantity in a sales permission time period representing a period to disposal, and calculates the safety stock quantity from the calculated two occurrence probabilities.

(Supplementary note 7) The recommended order quantity determining device according to supplementary note 6, wherein the first safety stock quantity calculation unit determines the safety stock quantity, based on a demand prediction quantity at which the occurrence probability of the demand prediction quantity in the unit delivery time period and the occurrence probability of the demand prediction quantity in the sales permission time period match.

(Supplementary note 8) The recommended order quantity determining device according to any one of supplementary notes 1 to 7, wherein the second safety stock quantity calculation unit calculates an occurrence probability of a demand prediction quantity in the coverage time period and an occurrence probability of a demand prediction quantity in a sales permission time period representing a period to disposal, and calculates the safety stock quantity from the calculated two occurrence probabilities.

(Supplementary note 9) The recommended order quantity determining device according to supplementary note 8, wherein the second safety stock quantity calculation unit determines the safety stock quantity, based on a demand prediction quantity at which the occurrence probability of the demand prediction quantity in the coverage time period and the occurrence probability of the demand prediction quantity in the sales permission time period match.

(Supplementary note 10) A recommended order quantity determination method including: calculating a safety stock quantity of a commodity at a first elapse time that is a time when a unit delivery time period has elapsed from one delivery time, the unit delivery time period being a unit of a delivery interval; calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and calculating a recommended order quantity of the commodity, based on the safety stock quantity of the commodity at the second elapse time, wherein in the case where prediction is made that a stock quantity at the first elapse time is less than the safety stock quantity at the first elapse time, a safety stock quantity of the commodity at a time when the coverage time period has elapsed from the first elapse time is calculated.

(Supplementary note 11) The recommended order quantity determination method according to supplementary note 10, wherein the recommended order quantity of the commodity is calculated from a stock quantity at the delivery time, a demand prediction quantity in the coverage time period, and the safety stock quantity of the commodity at the second elapse time.

(Supplementary note 12) A recommended order quantity determination program for causing a computer to execute: a first safety stock quantity calculation process of calculating a safety stock quantity of a commodity at a first elapse time that is a time when a unit delivery time period has elapsed from one delivery time, the unit delivery time period being a unit of a delivery interval; a second safety stock quantity calculation process of calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period; and a recommended order quantity calculation process of calculating a recommended order quantity of the commodity, based on the safety stock quantity of the commodity at the second elapse time, wherein in the second safety stock quantity calculation process, in the case where prediction is made that a stock quantity at the first elapse time is less than the safety stock quantity at the first elapse time, the computer is caused to calculate a safety stock quantity of the commodity at a time when the coverage time period has elapsed from the first elapse time.

(Supplementary note 13) The recommended order quantity determination program according to supplementary note 12, wherein in the recommended order quantity calculation process, the computer is caused to calculate the recommended order quantity of the commodity, from a stock quantity at the delivery time, a demand prediction quantity in the coverage time period, and the safety stock quantity of the commodity at the second elapse time.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST 10 storage unit
20 first safety stock quantity calculation unit
30 second safety stock quantity calculation unit
40 recommended order quantity calculation unit
100 recommended order quantity determining device

The invention claimed is:

1. A recommended order quantity determining device comprising a hardware processor configured to execute a software code to:
   calculate a safety stock quantity of a commodity at a first elapse time that is a time when a unit delivery time period has elapsed from one delivery time, the unit delivery time period being a unit of a delivery interval;
   calculate a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period;
   calculate a recommended order quantity of the commodity, based on the safety stock quantity of the commodity at the second elapse time; and
   calculate an occurrence probability of a demand prediction quantity in at least one of the unit delivery time period and the coverage time period, an occurrence probability of a demand prediction quantity in a sales permission time period representing a period to disposal, and the safety stock quantity from the calculated two occurrence probabilities,
   wherein in the case where prediction is made that a stock quantity at the first elapse time is less than the safety stock quantity at the first elapse time, the hardware processor is configured to execute a software code to calculate a safety stock quantity of the commodity at a time when the coverage time period has elapsed from the first elapse time.

2. The recommended order quantity determining device according to claim 1, wherein the hardware processor is configured to execute a software code to calculate the recommended order quantity of the commodity, from a stock quantity at the delivery time, a demand prediction quantity in the coverage time period, and the safety stock quantity of the commodity at the second elapse time.

3. The recommended order quantity determining device according to claim 1, wherein the hardware processor is configured to execute a software code to calculate the safety stock quantity of the commodity at the second elapse time at which the coverage time period determined depending on a sales permission time period representing a period to disposal has elapsed.

4. The recommended order quantity determining device according to claim 3, wherein the hardware processor is configured to execute a software code to calculate the safety stock quantity of the commodity at the second elapse time, using the coverage time period combining the number of unit delivery time periods that is not greater than a predetermined number.

5. The recommended order quantity determining device according to claim 1, wherein the hardware processor is configured to execute a software code to calculate a recommended order quantity of a long freshness commodity which is a commodity whose sales permission time period representing a period to disposal is longer than twice the unit delivery time period.

6. The recommended order quantity determining device according to claim 1, wherein the at least one of the unit delivery time period and the coverage time period is the unit delivery time period.

7. The recommended order quantity determining device according to claim 6, wherein the hardware processor is configured to execute a software code to determine the safety stock quantity, based on a demand prediction quantity at which the occurrence probability of the demand prediction quantity in the unit delivery time period and the occurrence probability of the demand prediction quantity in the sales permission time period match.

8. The recommended order quantity determining device according to claim 1, wherein the at least one of the unit delivery time period and the coverage time period is the coverage time period.

9. The recommended order quantity determining device according to claim 8, wherein the hardware processor is configured to execute a software code to determine the safety stock quantity, based on a demand prediction quantity at which the occurrence probability of the demand prediction quantity in the coverage time period and the occurrence probability of the demand prediction quantity in the sales permission time period match.

10. A recommended order quantity determination method comprising:
    calculating a safety stock quantity of a commodity at a first elapse time that is a time when a unit delivery time period has elapsed from one delivery time, the unit delivery time period being a unit of a delivery interval;
    calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period;
    calculating a recommended order quantity of the commodity, based on the safety stock quantity of the commodity at the second elapse time; and
    calculating an occurrence probability of a demand prediction quantity in at least one of the unit delivery time period and the coverage time period, an occurrence probability of a demand prediction quantity in a sales permission time period representing a period to disposal, and the safety stock quantity from the calculated two occurrence probabilities, wherein in the case where prediction is made that a stock quantity at the first elapse time is less than the safety stock quantity at the first elapse time, a safety stock quantity of the commodity at a time when the coverage time period has elapsed from the first elapse time is calculated.

11. The recommended order quantity determination method according to claim 10, wherein the recommended order quantity of the commodity is calculated from a stock quantity at the delivery time, a demand prediction quantity in the coverage time period, and the safety stock quantity of the commodity at the second elapse time.

12. A non-transitory computer readable information recording medium storing a recommended order quantity determination program, when executed by a processor, that performs a method for:

calculating a safety stock quantity of a commodity at a first elapse time that is a time when a unit delivery time period has elapsed from one delivery time, the unit delivery time period being a unit of a delivery interval;

calculating a safety stock quantity of the commodity at a second elapse time that is a time when a coverage time period has elapsed from the delivery time, the coverage time period being a period combining a plurality of unit delivery time periods and determined depending on the commodity, the plurality of unit delivery time periods each being the unit delivery time period;

calculating a recommended order quantity of the commodity, based on the safety stock quantity of the commodity at the second elapse time; and calculating an occurrence probability of a demand prediction quantity in at least one of the unit delivery time period and the coverage time period, an occurrence probability of a demand prediction quantity in a sales permission time period representing a period to disposal, and the safety stock quantity from the calculated two occurrence probabilities, wherein in the case where prediction is made that a stock quantity at the first elapse time is less than the safety stock quantity at the first elapse time, a safety stock quantity of the commodity at a time when the coverage time period has elapsed from the first elapse time is calculated.

13. The non-transitory computer readable information recording medium according to claim 12, wherein the recommended order quantity of the commodity is calculated from a stock quantity at the delivery time, a demand prediction quantity in the coverage time period, and the safety stock quantity of the commodity at the second elapse time.

* * * * *